(12) United States Patent
Ritter et al.

(10) Patent No.: US 10,713,278 B2
(45) Date of Patent: Jul. 14, 2020

(54) FLEXIBLE CONFIGURATION OF OFFLINE SYNCHRONIZATION SCOPE

(71) Applicant: SAP SE, Walldorf (DE)

(72) Inventors: Gerd Ritter, Heidelberg (DE); Thomas Konstandin, Walldorf (DE); Carsten Brandt, Mannheim (DE); Tim Kornmann, Reilingen (DE)

(73) Assignee: SAP SE, Walldorf (DE)

( * ) Notice: Subject to any disclaimer, the term of this patent is extended or adjusted under 35 U.S.C. 154(b) by 318 days.

(21) Appl. No.: 15/831,712

(22) Filed: Dec. 5, 2017

(65) Prior Publication Data
US 2019/0171752 A1 Jun. 6, 2019

(51) Int. Cl.
G06F 16/27 (2019.01)
H04L 29/08 (2006.01)
H04L 12/26 (2006.01)

(52) U.S. Cl.
CPC .......... *G06F 16/27* (2019.01); *H04L 43/0811* (2013.01); *H04L 67/1095* (2013.01); *H04L 67/306* (2013.01)

(58) Field of Classification Search
CPC .................................................. H04L 67/1095
See application file for complete search history.

(56) References Cited

U.S. PATENT DOCUMENTS

| | | |
|---|---|---|
| 7,565,376 B2 | 7/2009 | Stegmann et al. |
| 7,624,340 B2 | 11/2009 | Ritter |
| 7,630,969 B2 | 12/2009 | Ritter |
| 7,680,783 B2 | 3/2010 | Ritter et al. |
| 7,689,904 B2 | 3/2010 | Ritter |
| 7,844,912 B2 | 11/2010 | Kornmann |
| 7,966,566 B2 | 6/2011 | Ritter et al. |
| 8,046,389 B2 | 10/2011 | Ritter |
| 8,099,661 B2 | 1/2012 | Ritter |
| 8,108,433 B2 | 1/2012 | Baeuerle et al. |
| 8,555,248 B2 | 10/2013 | Brunswig et al. |
| 8,606,723 B2 | 12/2013 | Seubert et al. |
| 8,655,756 B2 | 2/2014 | Seubert et al. |
| 8,661,356 B2 | 2/2014 | Demant et al. |
| 8,689,119 B2 | 4/2014 | Ritter et al. |
| 8,694,397 B2 | 4/2014 | Seubert et al. |

(Continued)

*Primary Examiner* — William Spieler
(74) *Attorney, Agent, or Firm* — Fish & Richardson P.C.

(57) ABSTRACT

Techniques are described for dynamically synchronizing applications executed on a client device with backend systems. An example method includes identifying a triggering event associated with a request to perform a synchronization of a client application, where the request is associated with a request for a partial synchronization of the client application. A set of information defining a request context associated with the request is obtained. A set of potential partial synchronization scenarios are identified, where each of the potential partial synchronization scenarios associated with a predefined synchronization context. The request context is compared to the predefined synchronization contexts of the set of potential partial synchronization scenarios to identify a particular partial synchronization scenario corresponding to the request context. In response to identifying the particular partial synchronization scenario corresponding to the request context, a set of synchronization operations defined in the identified partial synchronization scenario are performed.

17 Claims, 4 Drawing Sheets

Example Light Sync Types 220

225 → Light Sync 1:
- Context:
  230 {
  - Role = Service Technician
  - Connection = Poor cellular connection
- Sync Phases:
  235 {
  - Phase 1: Only upload changed data in client application
  - Phase 4: Download new data from backend related to service ticket objects associated with user
  - Phase 7: Download attachments related to phase 4 new data 240 → Light Sync 2:
- Context:
  245 {
  - Role = Service Technician
  - Connection = Good cellular connection OR WiFi connection
- Sync Phases:
  250 {
  - Phase 1: Only upload changed data in client application
  - Phase 3: Update personalization of screens
  - Phase 4: Download new data from backend related to all objects associated with user
  - Phase 5: Check if local application data is up-to-date
  - Phase 7: Download attachments related to phase 4 new data

(56) References Cited

U.S. PATENT DOCUMENTS

| | | |
|---|---|---|
| 8,706,804 B2 | 4/2014 | Kornmann et al. |
| 8,745,690 B2 | 6/2014 | Brunswig et al. |
| 8,893,031 B2 | 11/2014 | Kornmann et al. |
| 8,930,363 B2 | 1/2015 | Bettin et al. |
| 8,949,855 B2 | 2/2015 | Bettin et al. |
| 9,020,881 B2 | 4/2015 | Ritter et al. |
| 9,020,973 B2 | 4/2015 | Stumpf et al. |
| 9,032,001 B2 | 5/2015 | Stumpf et al. |
| 9,052,845 B2 | 6/2015 | Brandt |
| 9,053,445 B2 | 6/2015 | Brunswig et al. |
| 9,069,805 B2 | 6/2015 | Ritter et al. |
| 9,135,319 B2 | 9/2015 | Ritter et al. |
| 9,158,932 B2 | 10/2015 | Ritter et al. |
| 9,170,780 B2 | 10/2015 | Gieselmann et al. |
| 9,191,343 B2 | 11/2015 | Stollarski et al. |
| 9,191,357 B2 | 11/2015 | Stollarski et al. |
| 9,213,856 B2 | 12/2015 | Kornmann et al. |
| 9,286,578 B2 | 3/2016 | Ritter et al. |
| 9,396,446 B2 | 7/2016 | Ritter et al. |
| 9,459,846 B2 | 10/2016 | Bornheimer et al. |
| 2002/0114341 A1* | 8/2002 | Sutherland .............. H04L 41/00 370/428 |
| 2013/0060900 A1* | 3/2013 | Li ....................... H04L 67/1095 709/217 |
| 2013/0151469 A1* | 6/2013 | Baker .................... G06F 16/27 707/621 |
| 2014/0114920 A1* | 4/2014 | Zhang .................... H04L 67/06 707/634 |
| 2015/0281350 A1* | 10/2015 | Toksoz ................ H04L 67/1095 709/248 |
| 2015/0333951 A1* | 11/2015 | Yeom ................ H04L 29/08954 725/95 |
| 2016/0224648 A1* | 8/2016 | Le ..................... H04W 52/0258 |

\* cited by examiner

Example Phases of Synchronization 205

1. Upload of data changed offline on client device to backend
2. Update screen layout and other UI updates from backend system (i.e., from administrators)
3. Update personalization of screens
4. Check for and download new application data to be synchronized from backend
5. Check if previously downloaded application data is up-to-date (e.g., based on changes from other users)
6. Update code lists
7. Download / upload attachments associated with backend system and/or local application

FIG. 2A

Example Light Sync Types 220

Light Sync 1:
- Context:
  - Role = Service Technician
  - Connection = Poor cellular connection
- Sync Phases:
  - Phase 1: Only upload changed data in client application
  - Phase 4: Download new data from backend related to service ticket objects associated with user
  - Phase 7: Download attachments related to phase 4 new data

Light Sync 2:
- Context:
  - Role = Service Technician
  - Connection = Good cellular connection OR WiFi connection
- Sync Phases:
  - Phase 1: Only upload changed data in client application
  - Phase 3: Update personalization of screens
  - Phase 4: Download new data from backend related to all objects associated with user
  - Phase 5: Check if local application data is up-to-date
  - Phase 7: Download attachments related to phase 4 new data

FIG. 2B

FLEXIBLE CONFIGURATION OF OFFLINE SYNCHRONIZATION SCOPE

BACKGROUND

The present disclosure relates to a system and computerized method for dynamically synchronizing applications executed on a client device with backend systems.

Many applications and processes previously executed solely on backend functionality are now provided with client-side versions, where those client-side versions may include mobile applications executing on smartphones, tablets, and other mobile devices. In some cases, those mobile applications can be used offline and allowed to operate while no or little network connectivity is available, or where users optionally choose to work offline (e.g., where doing so may be faster or routing may be too expensive). In current mobile applications, re-synchronizing with current application data (e.g., by uploading from the mobile application and/or by downloading from a backend server or data source) can be a time- and resource-consuming process. Full synchronization of the client or mobile application, particularly with limited network connections for the mobile device or when a user or device wants or needs immediate information without the time or resources required for a network round-trip or communications, may cause significant device and application delays as significant portions of data unnecessary for immediate usage of the application may be exchanged with the backend system.

SUMMARY

Implementations of the present disclosure are generally directed to dynamically synchronizing applications executed on a client device with backend systems. In one example implementation, a computerized method executed by hardware processors can be performed. The example method can comprise identifying a triggering event associated with a request to perform a synchronization of a client application executing on a client device, where the request is associated with a request for a partial synchronization of the client application. A set of information defining a request context associated with the request to perform the synchronization of the client application is obtained. A set of potential partial synchronization scenarios are identified, where each of the potential partial synchronization scenarios associated with a predefined synchronization context. The request context is compared to the predefined synchronization contexts of the set of potential partial synchronization scenarios to identify a particular partial synchronization scenario corresponding to the request context. In response to identifying the particular partial synchronization scenario corresponding to the request context, a set of synchronization operations defined in the identified partial synchronization scenario are performed.

Implementations can optionally include one or more of the following features. In some instances, the request context identifies a network connection speed or connection quality of the client device to a particular communications network at the time of the identified triggering event. In those instances, at least two of the potential partial synchronization scenarios may be associated with predefined synchronization contexts identifying two different network connections speeds or quality. In such instances, comparing the request context to the predefined synchronization contexts can comprise matching the network connection speed or quality of the client device to a network connection speed or quality defined in at least one of the predefined synchronization contexts.

In some instances, the request context identifies a set of user-specific information associated with the user of the client device. In those instances, the set of user-specific information can include at least one role associated with the user of the client device, wherein at least two of the potential partial synchronization scenarios are associated with predefined synchronization contexts identifying at least one particular role within an organization. In those instances, comparing the request context to the predefined synchronization contexts can comprise matching the at least one role associated with the user of the client device to at least one role defined in at least one of the predefined synchronization contexts.

In some instances, the set of user-specific information uniquely identifies the user of the client device, and at least one of the predefined synchronization contexts of the potential partial synchronization scenarios specifically identifies the user of the client device. In those instances, comparing the request context to the predefined synchronization contexts can comprise associating at least one of potential partial synchronization scenarios having a predefined synchronization context specifically identifying the user of the client device as the particular partial synchronization scenario.

In some instances, the request context identifies a time of a last synchronization of the client application. At least one of the predefined synchronization contexts of the potential partial synchronization scenarios can be associated with a predefined synchronization context representing a particular time since a prior synchronization.

In some instances, each of the partial synchronization scenarios define a particular combination of synchronization phases to be performed during execution of the particular partial synchronization scenario, wherein each synchronization phases identifies particular synchronization actions. In those instances, a full synchronization scenario performs a first set of synchronization phases, and wherein each of the partial synchronization scenarios perform a subset of the first set of synchronization phases. In those instances, for at least one partial synchronization scenario comprising, a subset of the first set of synchronization phases, executing the at least one partial synchronization scenario comprises performing a partial execution of at least one synchronization phase.

In some instances, the triggering event occurs in response to an action performed in a user interface associated with the client application, where the triggering event includes an indication of a request to perform a partial synchronization of the client application.

In some instances, the triggering event occurs automatically in response reestablishing a network connection after a period of offline activity for the client application.

Similar operations and processes may be performed in a system comprising at least one processor and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 2A represents an example illustration of potential phases of synchronization possible for a full sync and a partial light sync.

FIG. 2B represents an example illustration of contexts and sync phases associated with two different, but related light sync types.

DETAILED DESCRIPTION

Figure 1:
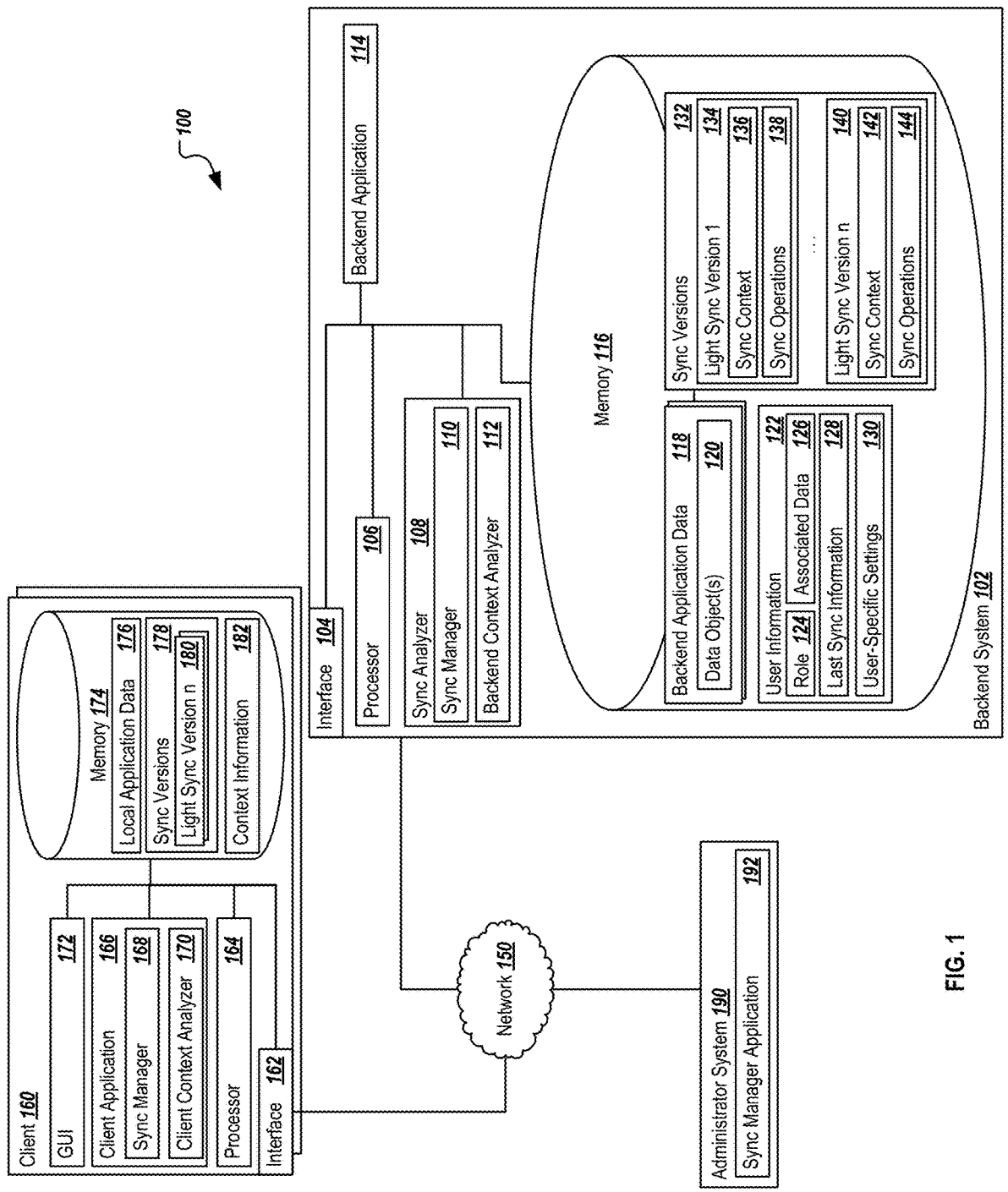
FIG. 1 is a block diagram illustrating an example system for dynamically synchronizing applications executed on a client device with backend systems.

The present disclosure describes systems and methods for implementing a solution for dynamically synchronizing applications executed on a client device with backend systems. As mobile and client applications associated with backend business applications are continuously rolled out, synchronizations between the mobile, or client, applications and the backend application(s) and/or system(s) may need to be performed throughout the day. Depending on the application, significant synchronization operations may be performed in a complete synchronization process, such that large amounts of data are downloaded to and uploaded from the client device during full synchronizations. In situations where the client device has a strong network connection and/or no limits on data transmissions (e.g., on a strong WiFi network or on an advanced cellular network connection), and where the user has time to wait for the application to complete the synchronization operations, a full synchronization may be an acceptable solution. However, many users may find that the user experience and application functionality needed at a particular time cannot withstand the time or resources required to complete a full synchronization. Example instances where the network traffic and delay associated with a full synchronization may not be wanted may include where the client device experiences a slow or expensive network connection, where the user is in need of a small set of documents, updates, or other information related to a specific task that is needed from the backend system, or where only a base level of information is required for the current operation or action, among others.

In addressing the differing needs and timing required by particular users, the present solution offers methods and a system for performing dynamically identified partial synchronizations based on a determined context associated with the client device at which the mobile application is executing (e.g., a determined strength or quality of a network connection of the client device), the immediate or expected needs of a particular user or a user in the same role of the particular user, and/or the type of information that is needed, among others. A plurality of partial synchronization scenarios can be defined by an administrator, key users with technical and business experience used to understand the requirements of particular users or groups of users, and/or a particular user himself or herself, among others.

In some instances, the plurality of partial, or light, synchronization scenarios can be stored at the client device or remotely at the backend system, a synchronization server, or elsewhere. Each of those partial synchronization scenarios can each be associated with a predefined context defining when particular scenarios are to be used when a partial or light sync is requested. At the time a particular synchronization request is made, one or more components of a request context can be identified. In some instances, the request context may be specific to the current quality or strength of the network connection of the client device. In others, the request context can identify the particular user or a role of the particular user associated with the client application triggering or associated with the light sync request. In some instances, the request context may further be derived based on a current schedule of the user (e.g., in a meeting with a particular client), or based on recent actions or operations performed within the client application (e.g., requesting an updated and current price or inventory number), such that a curated synchronization need based on prior operations is dynamically calculated by a context analyzer to determine the particular scenario to be applied. In some instances, a combination of one or more of these contextual components can be combined to identify or define the request context, and can then be matched to a particular partial synchronization scenario. In many instances a partial synchronization can be triggered without the user specifically identifying a particular version or type of partial synchronization to be used, allowing an automated sync manager to derive the appropriate scenario to be applied based on the context. In other instances, the request context may include a selection or indication of a particular partial synchronization scenario to be applied, such as where a user interface (UI) associated with the client application provides such options.

As described, the present solution allows key users, administrators, and the end user to configure and trigger only a subset of synchronization phases as a light sync in lieu of a full synchronization. The administrator or key user can define which synchronization phases are actually triggered in particular contexts as well as the scope at which those phases are performed. For example, one expensive synchronization check may be to determine or check whether particular application data that has previously been downloaded is up to date at the time of a synchronization request. If the request context is associated with a limited network connection or the sync is requested quickly, the check described above can be omitted (e.g., by omitting the check synchronization phase) or only a specific subset of data may be checked during the sync (e.g., by reducing or limiting the scope of the check synchronization phase). An additional advantage may be related to server load. For example, if on each synchronization a 2 minute actions occurs on the backend (e.g., checking all data to be updated to the device), such actions can be costly to the backend system. The described processes allows the backend owner to protect their resources by setting or assigning particular synchronization scopes, as desired and based on an expected impact to their systems. One example protection may be to not allow even key users to schedule full synchronizations every minute, but to only allow such full syncs after a particular length of time. While many advantages are described herein, including the reduction of network traffic, the increased efficiency of the targeted synchronizations and therefore, of the executing client application, many others will also be understood by a person of skill in the art.

Turning to the illustrated implementation, FIG. 1 is a block diagram illustrating an example system 100 for implementing the dynamic synchronization of client applications executed on a client device with backend systems. As illustrated in FIG. 1, system 100 is associated with a system for managing requests for full and partial synchronizations triggered or initiated at a client 160 executing a client application 166, and can allow the illustrated components to share and communicate information across devices and systems (e.g., backend system 102, client 160, and administrator system 190, among others, via network 150). In some instances, at least some or all of the components may be cloud-based components or solutions, while in others, non-cloud systems may be used. In some instances, non-cloud-based systems, such as on-premise systems, may use or adapt the processes described herein. Although components are shown individually, in some implementations, functionality of two or more components, systems, or servers may be provided by a single component, system, or server.

At least two different implementations are considered with regard to the synchronization requests. In some instances, information about the synchronization request may be generated at the client application 166 and transmitted, via network 150, to the backend system 102 and its sync analyzer 108. In those instances, in response to the request, the sync analyzer 108 can determine the request context based on information associated with the request and/or information stored on the backend system 102, and can further determine which of the particular light sync versions (e.g., versions 134, 140, etc.) are to be applied. In those instances, the backend system 102 can then provide any updated information associated with the light sync to the client application 166 and request any updates from the client 160 regarding changes to be uploaded to the backend system 102, where appropriate. In other instances, the client application 166 or a component executing at the client 160 (e.g., sync manager 168 and client context analyzer 170) can use a set of context information obtained at the client 160 to determine the particular light sync version n 180 should be applied. In response to that determination, the client application 166 and/or any other suitable component at the client 160 can initiate the requests for particular backend application data 118 corresponding to the appropriate light sync version 180 and can provide or upload any information to be synchronized with the backend system 102 from the client 160 as appropriate. In some other instances, a combination of determinations may be used between the client 160 and the backend system 102 to determine the appropriate light sync version to be applied in response to a particular request.

As used in the present disclosure, the term "computer" is intended to encompass any suitable processing device. For example, backend system 102 and client 160 may be any computer or processing device such as, for example, a blade server, general-purpose personal computer (PC), Mac®, workstation, UNIX-based workstation, or any other suitable device. Moreover, although FIG. 1 illustrates a single backend system 102, the system 100 can be implemented using a single system or more than those illustrated, as well as computers other than servers, including a server pool. In other words, the present disclosure contemplates computers other than general purpose computers, as well as computers without conventional operating systems. Similarly, the client 160 may be any system which can request data and/or interact with the backend system 102. The client 160, in some instances, may be a desktop system, a client terminal, or any other suitable device, including a mobile device, such as a smartphone, tablet, smartwatch, or any other mobile computing device. In general, each illustrated component may be adapted to execute any suitable operating system, including Linux, UNIX, Windows, Mac OS®, Java™, Android™, Windows Phone OS, or iOS™, among others.

In general, the backend system 102 may be associated with the execution of one or more backend or business applications 114 and their associated functionality. In some instances, the backend system 102 may be a dedicated synchronization server, where the backend system's 102 primary functionality relates to actions associated with ensuring that the client application 166 is suitably synchronized to a set of backend application data 118. In some instances, the backend system 102 may be associated with an end-to-end business solution system, enterprise resource planning (ERP) systems, customer resource management (CRM) systems, business intelligence systems, cloud platform systems, supplier management (SM) systems, or any other suitable system, including non-business-related systems. In general, the backend system 102 executes one or more backend applications 114 related to the underlying operations of the system 102, and with which the client application 166 is associated. To perform these operations, a set of backend application data 118 is maintained in association with the backend application 114, at least some of which may be provided to or shared with the client application 166. In some instances, at least some of the backend application data 118 may be or may include one or more data objects 120. The data objects 120 may be business objects, or any other suitable object type. In one example, each business object may be an entity that works in conjunction with data access and business logic layers to transport and manage data. In the illustrated example, the backend system 102 can store and access data based on particular data objects 120 or instances thereof, e.g., a business object. Example business objects can include a Sales Order object, a Customer object, a Supplier object, an Address object, and the like. In some examples, each business object defines a data structure including one or more attributes of the respective object, a data value being provided for each attribute. In some examples, each business object includes a primary key. For example, metadata of the business object can identify a particular attribute as the primary key for the particular object. In some examples, data for the business object is stored in one or more database tables. For example, when a business object is accessed, data can be retrieved from a database table (table) to populate the business object.

As operations associated with the backend application 114 are performed, or as operations performed by the client application 166 are executed, at least some of the backend application data 118 may be changed. In some instances, the backend application data 118 may also define a look and feel of the client application 166, such as the definition of particular UIs or personalized visualizations or modifications to the client application 166 defined by user preference or for users of a particular type. The backend application data 118 may define particular business data relevant to particular users, such as updated service tickets, purchase orders, customer account information, and client contact information, among others.

Some or all of that information stored in or related to the backend application data 118 may be relevant to different users. Particular portions or types of that information, when changed, new, or deleted, may be of higher relevance or urgency to particular users or to particular types of users, or to users in a particular situation or context. Based on the known relevance of particular types or sets of the backend application data 118, a plurality of sync versions 132 may be defined so that different users interacting with the backend system 102 and its data via the client application 166 can exchange up-to-date information sets and application data 118 as needed or desired. Some updated data, such as overall changes to a UI or user-specific personalizations may not be needed to successfully complete a particular operation. In those instances, such presentation-related data can be excluded from one or more light sync versions 132, particularly those related to poor or limited network connections and/or those related to a need for increased speed in returning a particular set of information. That data can instead be provided during a full sync or when a particular request context indicates that addition time and/or bandwidth for receiving the additional information is available, or in response to a user's manual request for or including such information.

As illustrated, the backend system 102 includes interface 104, processor 106, sync analyzer 108, the backend application 114, and memory 116. The interface 104 is used by the backend system 102 for communicating with other systems in a distributed environment—including within the environment 100—connected to the network 150, e.g., one or more clients 160, administrator system 190, as well as other systems communicably coupled to the illustrated backend system 102 and/or network 150. Generally, the interface 104 comprises logic encoded in software and/or hardware in a suitable combination and operable to communicate with the network 150 and other components. More specifically, the interface 104 may comprise software supporting one or more communication protocols associated with communications such that the network 150 and/or interface's hardware is operable to communicate physical signals within and outside of the illustrated environment 100. Still further, the interface 104 may allow the backend system 102 to communicate with one or more clients 160 and/or the administrator system 190 regarding particular synchronization settings and requests, as described in the present disclosure.

Network 150 facilitates wireless or wireline communications between the components of the environment 100 (e.g., between the backend system 102 and a particular client 160), as well as with any other local or remote computer, such as additional mobile devices, clients (e.g., client 160), servers, or other devices communicably coupled to network 150, including those not illustrated in FIG. 1. In the illustrated environment, the network 150 is depicted as a single network, but may be comprised of more than one network without departing from the scope of this disclosure, so long as at least a portion of the network 150 may facilitate communications between senders and recipients. In some instances, one or more of the illustrated components (e.g., the backend system 102) may be included within network 150 as one or more cloud-based services or operations. The network 150 may be all or a portion of an enterprise or secured network, while in another instance, at least a portion of the network 150 may represent a connection to the Internet. In some instances, a portion of the network 150 may be a virtual private network (VPN). Further, all or a portion of the network 150 can comprise either a wireline or wireless link. Example wireless links may include 802.11a/b/g/n/ac, 802.20, WiMax, LTE, and/or any other appropriate wireless link. In other words, the network 150 encompasses any internal or external network, networks, sub-network, or combination thereof operable to facilitate communications between various computing components inside and outside the illustrated environment 100. The network 150 may communicate, for example, Internet Protocol (IP) packets, Frame Relay frames, Asynchronous Transfer Mode (ATM) cells, voice, video, data, and other suitable information between network addresses. The network 150 may also include one or more local area networks (LANs), radio access networks (RANs), metropolitan area networks (MANs), wide area networks (WANs), all or a portion of the Internet, and/or any other communication system or systems at one or more locations.

The backend system 102 also includes one or more processors 106. Although illustrated as a single processor 106 in FIG. 1, multiple processors may be used according to particular needs, desires, or particular implementations of the environment 100. Each processor 106 may be a central processing unit (CPU), an application specific integrated circuit (ASIC), a field-programmable gate array (FPGA), or another suitable component. Generally, the processor 106 executes instructions and manipulates data to perform the operations of the backend system 102, in particular those related to the backend application 114 and the sync analyzer module 108. Specifically, the processor(s) 106 executes the algorithms and operations described in the illustrated figures, as well as the various software modules and functionality, including the functionality for sending communications to and receiving transmissions from clients 160 and administrator system 190, as well as to other devices and systems. Each processor 106 may have a single or multiple core, with each core available to host and execute an individual processing thread.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

Turning to the sync analyzer 108, operations are provided when executed by the processor 106 to identify a triggering event associated with a synchronization event from one or more clients 160 (e.g., a triggering event) and to, in response, determine the type of synchronization to be provided or initiated based on a matching or corresponding contextual analysis. In some instances, the sync analyzer 108 may be included in or part of the functionality of the backend application 114 or generally the backend system 102, while in others, the sync analyzer 108 may be separate from the backend application 114 and/or the backend system 102. In general, the sync analyzer 108 may be any component, software, agent, or functionality used to determine a type of synchronization to be performed in response to a request for synchronization from the client application 166.

The present illustration describes two potential synchronization schemes: a first where the determination of the particular sync version 132 is made at the backend system 102 and a second where the determination is made at the client 160. In some instances, both may be possible to implement in a single system at the same time, and can be used in different situations and client applications 166. In some instances, where the determination is made at the backend system 102, the sync analyzer 108 can receive a partial sync request (or a generic sync request) from the client application 166, where the request may include at least some contextual information about the client 160 and/or the client application 166. In some instances, only the partial sync request or generic sync request may be received.

In response to receiving the request, the sync analyzer 108 can, via the backend context analyzer 112, determine a particular context associated with the request (e.g., the request context). Particular information included in the context can include, but is not limited to, information about the particular client 160 sending the request, a particular user associated with the request, a role of a particular user associated with the request, real-time information about the client 160 and/or the client application 166 such as a current network connection strength or quality, a time of a last synchronization of the client application 166, a current or recent absolute or relative location of the client 160, as well as any other suitable information. In some instances, the backend context analyzer 112 can obtain contextual information from the request for synchronization received from the client application 166. In some instances, the received sync request can include a user identifier, such as a unique identifier for a user account, as well as a snapshot of or relevant information about the currently executing client application 166 or client 160 (e.g., a network connection speed or quality, etc.).

In other instances, the backend context analyzer 112 can obtain contextual information about a particular request through information stored at or accessible by the backend system. Examples of this information include user information 122, which can include, for example, an identification of a particular user's role 124, an identification of data 126 specifically associated with or relevant to the user, last sync information 128 identifying the last time a full or partial synchronization was performed for the user or the user's particular client application 166, and one or more user-specific settings 130. In some instances, the last sync information 128 may include an indication of the data that has previously been synced to the client 160. The user-specific settings 130 may be set by an administrator at the administrator system 190, by a key user designing particular variations of sync versions 132, or by the end user associated with the client 160, among others. Those settings 130 may extend or modify the default set of sync versions 132 to provide for a user-specific modification.

Once the context is obtained, the sync analyzer 108 (e.g., via the sync manager 110) can use the obtained context information to identify which of the particular sync versions 132 should be applied to the current request. As illustrated, a plurality of sync versions 132 may be available. In the illustrated example, two sync versions, light sync version 1 134 and light sync version n 140 are shown, although many more may be included in a particular implementation. Additionally, only a single light sync version 1 134 may be available in certain instances. Each of the sync versions 132 may be generically defined for all applications, or those sync versions 132, or a portion thereof, may be specifically applicable to particular client applications 166. In some instances, different backend applications 114 and their corresponding client applications 166 may be associated with different sets of sync versions specific to the operations, requirements, and needs of those applications 114, 166.

As shown, each light sync version 134, 140 is associated with a sync context 136, 142 and a set of sync operations 138, 144. The sync context 136 associated with a particular light sync version defines in which instances a particular sync version 132 is to be applied. The sync contexts can be predefined parameters or combinations of contextual definitions that can be compared to the request context as determined by the backend context analyzer 112. If a particular sync version's context matches or best corresponds to the request context, the sync manager 110 can associate a particular sync version 134, 140 to the received sync request.

The set of sync operations 138, 144 provided in the particular sync versions define the sync operations to be performed when a particular sync version is executed. For discussion purposes, the sync operations to be performed may be defined as phases of synchronization. FIG. 2A illustrates a set of example phases of synchronization 205. Those phases 210 include (1) performing an upload of data changed offline or since the last connection to the backend system, (2) updating a screen layout and other UI updates defined in the backend system, (3) updating personalizations of the UI or presentation screens associated with the client application 166, (4) performing a check on the backend system to determine if new application data is to be synchronized to the client application 166 and if available, perform the download, (5) performing a check whether previously downloaded application data on the client application 166 is up-to-date, (6) performing an update of code lists associated with the client application 166, and (7) downloading or uploading attachments associated with the backend system and/or the local client application 166. As noted, these are meant to be example phases, and other phases may be used in different examples.

In addition to identifying particular phases, the sync operation 138, 144 definitions can define particular scopes of those identified phases to be executed. For example, with regard to the phase 4 example (i.e., checking for new data and downloading, if available), only certain sets of data may be defined in the sync operations to be applied. In one example, only specific data objects 120 may be within scope of a particular phase included in a particular set of sync operations 138, 144.

FIG. 2B illustrates two example light sync types 220, a light sync 1 225 and a light sync 2 240. Light sync 1 225 includes a context 230 and a set of sync phases 235 representing the sync operations when light sync 1 225 is used. The sync context 230 identifies two contextual points: (1) that the role of the user associated with the client application 166 is a "Service Technician" as defined within the organization or application, and (2) that the network connection of the client 160 is a poor cellular connection (as suitably defined). If that context is met by the request context, the sync phases 235 performed in the light sync 1 225 comprise phase 1, phase 4, and phase 7. However, the scope of those sync phases 235 are limited in some instances, in particular to phase 4—where only new data related to service ticket objects associated with the particular user associated with the request are downloaded—and phase 7—where only attachments associated with the downloaded new data related to the service ticket objects are downloaded. In specifying these limited scopes, the light sync 1 225 process can specifically identify a limited set of information to be downloaded to the client application 166 during a sync, thereby reducing the necessary bandwidth and network traffic required to update the client application 166 for the operations typically performed by the service technician.

Light sync 2 240 is similar to light sync 1 225, but is associated with a context 245 where this sync version is used when the role is a "Service Technician" and the network connection is identified as either a good cellular connection or a WiFi connection. Because the network connection is relatively stronger than the context 230 of light sync 1 225, the sync phases 250 of light sync 2 240 includes two additional phases (i.e., Phase 3, the update to any personalizations of screens, and Phase 5, a check to determine if the local application data is up-to-date). Additionally, the scope of phase 4 is enhanced and broadened to download new data from the backend related to all objects associated with the user, not just the service ticket objects as phase 4 was limited in light sync 1 225.

As described, any number of different light sync versions performing partial synchronization operations can be defined. The illustration of FIG. 2B is not meant to be limited, but is instead meant to provide an example of one set of differing contexts and operations used to differentiate between different versions. Additional contextual information can be used to determine which sync version to apply in other instances such as that described elsewhere in this application. In some instances, some sync versions may include a full sync, where the full sync is associated with one or more contexts in which the full sync is executed, such that all available phases 210 are executed without a limitation of scope. Example contexts in those instances may include a determination of a high quality and speed network connection and a certain length of time since the last synchronization, the fact that no prior synchronization has ever been performed (e.g., the next sync will be an initial sync), or a current or relative location of the client 160. In those instances, the full synchronization may be included in the sync versions 132 and applied when appropriate.

Returning to FIG. 1, once the correct sync version 132 is determined, the sync manager 110 or any other suitable component or functionality can perform or manage the synchronization operations of the appropriate sync version 132. In some instances, the sync manager 110 can direct particular operations of the client application 166 corresponding to the defined operations of the appropriate sync version 132. The sync manager 110 can also be used to determine the particular operations to be performed and pushed or otherwise provided to the client application 166.

Memory 116 of the backend system 102 may represent a single memory or multiple memories. The memory 116 may include any memory or database module and may take the form of volatile or non-volatile memory including, without limitation, magnetic media, optical media, random access memory (RAM), read-only memory (ROM), removable media, or any other suitable local or remote memory component. The memory 116 may store various objects or data (e.g., the backend application data 118, user information 122, and the sync versions 132, as well as others, etc.), including financial data, user information, administrative settings, password information, caches, applications, backup data, repositories storing business and/or dynamic information, and any other appropriate information associated with the backend system 102 including any parameters, variables, algorithms, instructions, rules, constraints, or references thereto. Additionally, the memory 116 may store any other appropriate data, such as VPN applications, firmware logs and policies, firewall policies, a security or access log, print or other reporting files, as well as others. While illustrated within the backend system 102, memory 116 may be located remote from the backend system 102 in some instances, including as a cloud application or repository, or as a separate cloud application or repository when the backend system 102 itself is a cloud-based system.

As illustrated and described, one or more clients 160 may be present in the example system 100. Each client 160 may be associated with requests transmitted to the backend system 102 related to the client application 166 executing on or at the client 160 and any synchronization requests associated with the backend application data 118. In some instances, many of the operations and determinations associated with the particular sync version to be applied may be determined at the client 160 and by the client application 166. For example, the various possible sync versions 132 may be initially defined and can be provided to the client 160 for future use. In those instances, the client application 166 can perform at least some of the operations associated with determining the appropriate sync version 178. Particular sync versions 132 can be synchronized to the client 160 and stored in memory 174 for determination and execution of particular sync versions 178 when requested.

As illustrated, the client 160 may include an interface 162 for communication (similar to or different from interface 104), a processor 164 (similar to or different from processor 106), the client application 166, memory 174 (similar to or different from memory 116), and a graphical user interface (GUI) 172.

The illustrated client 160 is intended to encompass any computing device such as a desktop computer, laptop/notebook computer, mobile device, smartphone, personal data assistant (PDA), tablet computing device, one or more processors within these devices, or any other suitable processing device. In general, the client 160 and its components may be adapted to execute any operating system, including Linux, UNIX, Windows, Mac OS®, Java™, Android™, or iOS. In some instances, the client 160 may comprise a computer that includes an input device, such as a keypad, touch screen, or other device(s) that can interact with the client application 166, and an output device that conveys information associated with the operation of the applications and their application windows to the user of the client 160. Such information may include digital data, visual information, or a GUI 172, as shown with respect to the client 160. Specifically, the client 160 may be any computing device operable to communicate queries or communications to the backend system 102, other clients 160, and/or other components via network 150, as well as with the network 150 itself, using a wireline or wireless connection. In general, client 160 comprises an electronic computer device operable to receive, transmit, process, and store any appropriate data associated with the environment 100 of FIG. 1.

Client application 166 may be any suitable application, program, mobile app, or other component. As illustrated, the client application 166 interacts with the backend system 102 to perform client-side operations associated with a particular backend application 114 and to update a set of local application data 176 associated with the client application 166 and the respective user of the client 160 via network 150. In some instances, the client application 166 may be a browser, where the functionality of the client application 166 may be realized using a web application or website the user can interact with via the client application 166. In other instances, the client application 166 may be a remote agent, component, or client-side version of the backend system 102 and the backend application 114. In some instances, the client application 166 may interact directly with the backend system 102, another client-side component, or at the backend system 102. The client application 166 may be operable to perform in either an offline or online mode. When offline (e.g., not connected to a network or associated with a slow or poor connection), information may be updated at the client application 166 and stored as updated information in the local application data 176. Upon reconnecting with the network in an online session or improving the speed and/or quality of the network connection, a synchronization process can be performed automatically or in response to a manual user input. In some instances, the client application 166 may not sync continuously even while in an online mode, such that a suitable triggering event (e.g., a manual indication from a user, an action or event associated with the client application 166 occurring that is programmed to cause a synchronization request, or other suitable triggering event) initiates a synchronization process. In some instances, a full sync or a partial sync may be explicitly requested, or a type of partial sync may be requested, while in others, the synchronization request may not explicitly specify the type of synchronization to perform, merely that a synchronization is requested. In either event, the client application 166 may include or be associated with components and/or functionality capable of determining the appropriate sync version 180 to be applied in some instances. In others, the backend system 102 and its sync analyzer 108 or similar components may determine the appropriate sync, with the client application 166 sending the synchronization request along with relevant contextual information to the backend system 102.

In instances where the client application 166 manages the sync determination process, the client application 166 may include a sync manager 168 and a client context analyzer 170. The sync manager 168 and the client context analyzer 170 may perform similar operations as those described with regard to the sync manager 110 and the backend context analyzer 112. In general, the sync manager 168 can detect a triggering event associated with a synchronization and/or when a synchronization request occurs. In response, the client context analyzer 170 can obtain a current set of information identifying the context of the request, including information related to the network connection of the client 160, the identity of the user associated with the client 160 and/or the client application 166, recent operations of the user or the client application 166, a current or recent absolute or relative location of the client 160, as well as any other suitable information. In some instances, some of the relevant information may be stored remotely from the client 160. The context information 182 may be stored in memory 174, or may be dynamically determined, as appropriate. In some instances, the context information 182 may include or identify an action performed by the user of client 160, such as an indication of an interaction with a particular button or UI element (e.g., "Light Sync" button, or "Only Upload Changes" button).

Once the context is obtained or determined, the sync manager 168 can perform a comparison of the context to the sync contexts of the sync versions 178 (e.g., light sync version n 180) stored on the client 160. Alternatively, the sync manager 168 can connect to the backend system 102 and identify a particular matching or corresponding sync version 132 to be applied. The sync versions 178 stored in memory 174 may be identical to those described in memory 116 of the backend system 102, or they may be different. In some instances, the sync versions 178 at the client 160 may be stored in a different format than those sync versions 132 stored at the backend system 102, while in others, they may be similar or identical. Regardless, the sync manager 168 can determine which of the sync versions 178 to be applied, and can initiate and execute at least some of the operations as defined in the particular light sync version n 180 identified.

Figure 3B:
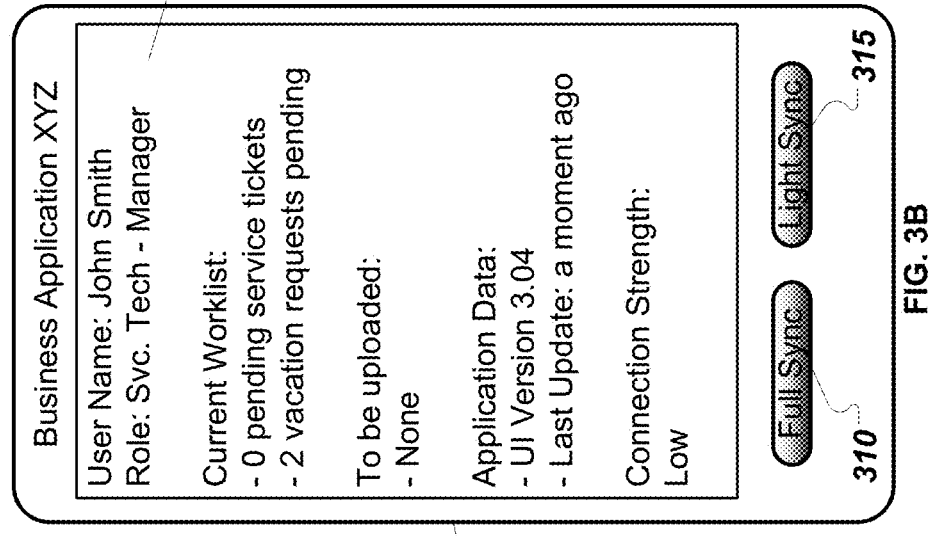
FIGS. 3A and 3B present example screenshots of a mobile application before and after a particular light sync operation is performed.
Figure 3A:
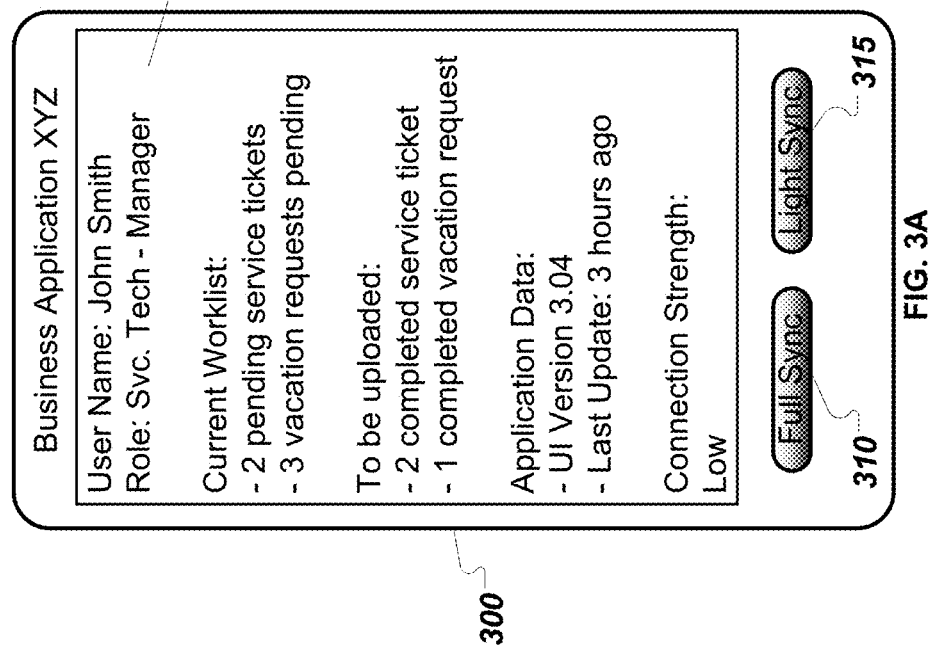

GUI 172 of the client 160 interfaces with at least a portion of the environment 100 for any suitable purpose, including generating a visual representation of the client application 166 and/or the content associated with the client application 166. In particular, the GUI 172 may be used to present screens or UIs associated with the client application 166. In some instances, those screens or UIs may include buttons or other interactive elements allowing users to initiate a synchronization. GUI 172 may also be used to view and interact with various Web pages, applications, and Web services located local or external to the client 160. Generally, the GUI 172 provides the user with an efficient and user-friendly presentation of data provided by or communicated within the system. The GUI 172 may comprise a plurality of customizable frames or views having interactive fields, pull-down lists, and buttons operated by the user. For example, the GUI 172 may provide interactive elements that allow a user to view or interact with information related to the operations of processes associated with the backend system 102, including the presentation of an interaction with particular application data associated with the client application 166 and the backend application 114. In general, the GUI 172 is often configurable, supports a combination of tables and graphs (bar, line, pie, status dials, etc.), and is able to build real-time portals, application windows, and presentations. Therefore, the GUI 172 contemplates any suitable graphical user interface, such as a combination of a generic web browser, a web-enable application, intelligent engine, and command line interface (CLI) that processes information in the platform and efficiently presents the results to the user visually. FIGS. 3A and 3B show an example GUI 172 for a particular client application 166.

FIG. 3A represents a display or mobile device 300 basic UI screen that provides an overview of the current user associated with the business application XYZ. Here, the user's name is John Smith, who has the roles of both Service Technician and Manager as illustrated within UI 305a. Initially, the user has a current worklist associated with 2 pending service tickets and 3 vacation requests pending. Further, 2 completed service tickets are ready to be uploaded to the backend system. Relevant application data identifies that the current UI version is 3.04, while the last update or synchronization for the application data was 3 hours ago. An analysis of the current network connection strength is identified as low. The presented screen may be an overview screen, where additional interactions occur in other portions of the client application 166. On the screen, two controls (e.g., buttons) are provided: control 310 associated with a request for a full sync, and control 315 associated with a request for a light sync. In response to the light sync control 315 being selected, the client application 166 can trigger the operations described herein, including those described later in FIG. 4. In particular, in response to the light sync 315, the client application 166 can initiate the sync determination process and proceed to perform the light sync corresponding to the set of contextual information associated with the current application 166, its recent operations, the client itself 160, and the user associated with the client.

As illustrated in FIG. 3B, an updated overview screen 305b is presented. Based on the determined light sync, several operations have been performed. First, the completed service tickets completed in the offline mode or after the previous sync are uploaded to the backend system in the light sync. Based on this, the status indicator shows that no pending service tickets remain as no new tickets were received from the backend system. Further, the 1 completed vacation request handled by the user while offline or after the previous sync is uploaded to the backend system. As no new vacation requests were received, the current worklist reflects the 2 remaining vacation requests to be addressed by the user. In the current example, UI version 3.1 was available at the backend system. However, due to the low network connection strength, the light sync identified for the process did not include an update to the UI, as the particular light sync scenario did not include that phase in the sync operations. Finally, the application data is updated to reflect the last update as "a moment ago."

Returning to FIG. 1, an administrator system 190 is illustrated. The administrator system 190 may be any system, computer, or device associated with an administrator with rights to modify the operations of the client application 166 and/or the backend application 114, including through changes to settings or other features of the software, including by defining or modifying particular sync versions 132, 178 and those sync versions' specific sync contexts and operations. In some instances, the administrator system 190 may be similar to one or more clients 160, with the functionality provided separately from the client application 166 or as part of the client application 166 not accessible to non-administrator users. In other instances, the administrator system 190 may access the backend application 114 and/or the sync analyzer 108 to perform modifications to one or more sync versions 132, including by adding new or different sync versions, or by modifying the context, operations, or scope of operations for existing sync versions. In some instances, the administrator system 190 may be associated with or can include a sync manager application 192 which provides the functionality to perform the sync version modifications, additions, and deletions.

While portions of the elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 4:
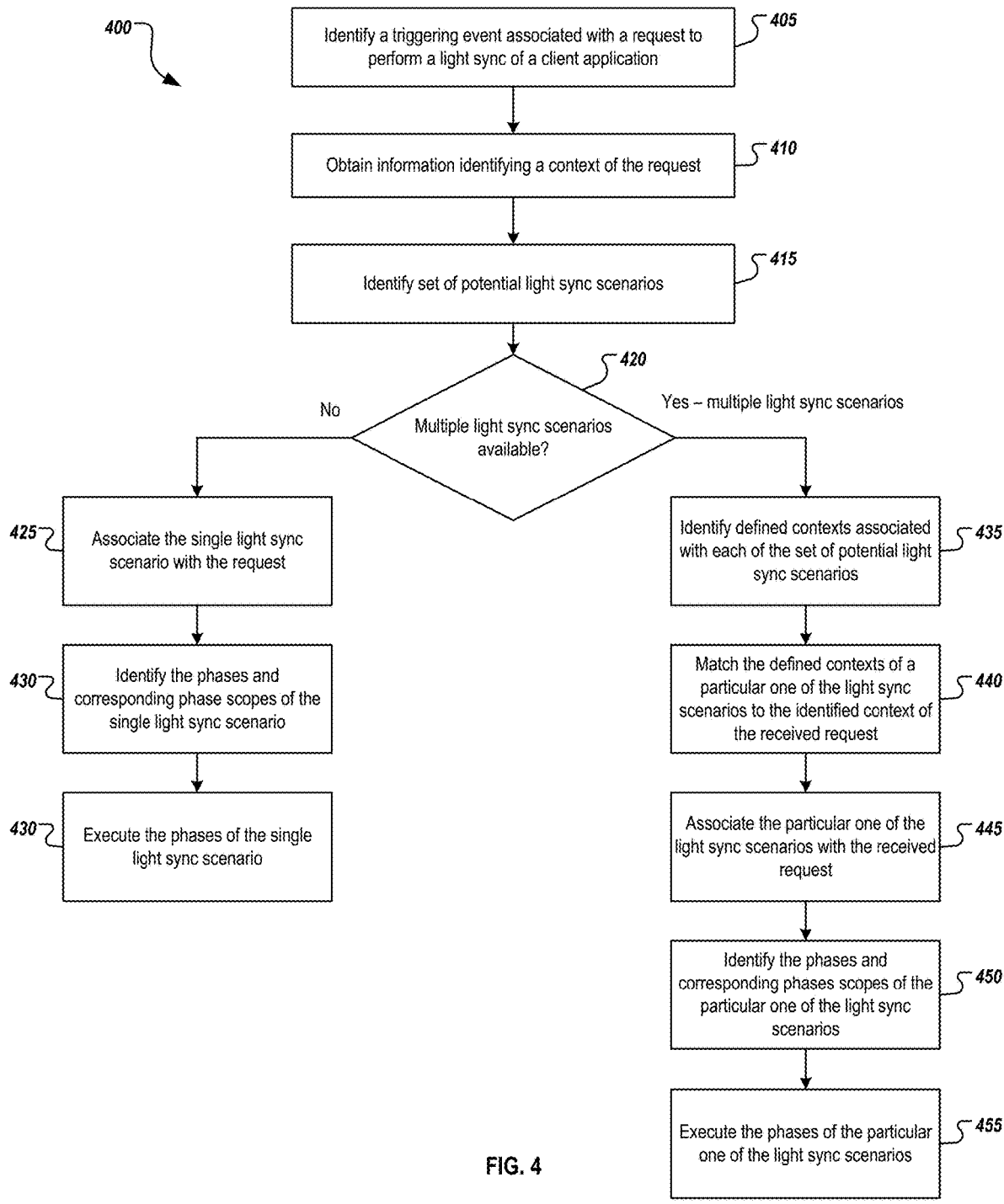
FIG. 4 represents an example flow for dynamically synchronizing applications executed on a client device with backend systems based on a context associated with a synchronization request.

FIG. 4 represents an example flow for dynamically synchronizing applications executed on a client device with backend systems based on a context associated with a synchronization request. For clarity of presentation, the description that follows generally describes method 400 in the context of the system 100 illustrated in FIG. 1. However, it will be understood that method 400 may be performed, for example, by any other suitable system, environment, software, and hardware, or a combination of systems, environments, software, and hardware as appropriate. For example, the operations described herein may be performed on a client (e.g., by client application 166) by a backend system (e.g., backend system 102), or by a synchronization system separate or remote from the backend system.

At 405, a triggering event associated with a request to perform or initiate a light or partial sync of a client application is identified. The triggering event may be a manual indication received at or based on interactions with a client application that a sync is requested. In some instances, a request for a full sync may also be identified. In some instances, the triggering event may merely be a request for or indication that a synchronization is to be performed, without a specific identification of the type or version of the synchronization to be performed, including in some instances whether a full sync or a partial or light sync is to be performed. In some instances, particular actions performed by or associated with the client application may cause the triggering event to occur, such as an attempted action after a certain amount of time has passed since a previous synchronization, an action requiring real-time or near real-time information to complete, as well as others.

At 410, information identifying a context of the synchronization request is obtained. The context information can be obtained, derived, requested, or accessed from a plurality of locations and sources. In some instances, such context information can include some or all of the following:

a current quality or strength of a network connection available to the client executing the client application associated with the synchronization request;

a particular connection type (e.g., free WiFI, cellular connection with or without roaming, etc.)

information uniquely identifying the user associated with the client application associated with the synchronization request;

a particular role or position within an organization of the user associated with the client application;

a current or recent location (e.g., away from an office location, at a known customer location, etc.) of the device;

information associated with a schedule or calendar of the user associated with the client application;

information identifying recent actions or operations performed by the client application (e.g., requesting an updated and current price or inventory number);

information on when the last full and/or partial synchronization occurred for the client application; and information on the triggering event (e.g., a manual request to sync or an automatically initiated request to sync), among others.

Certain portions of the context information may be obtained at or provided by the client, while other portions may be obtained at or provided by a backend system or other location remote from the client.

At 415, a set of potential light or partial sync scenarios can be identified. In some instances, a plurality of different sync scenarios may be available to the client application, while in others, only a single partial sync scenario may be defined. The sync scenarios or sync versions may be stored locally at the client or on a backend or synchronization system. In either event, the scenarios may be developed, created, and/or modified by administrators, key users, or end users, in different instances. Some scenarios may be created on a centralized or backend system and stored there. In some instances, those defined scenarios can be transmitted to one or more clients, where those clients can perform the determination of the proper partial synchronization to be performed in response to detecting a triggering event. In some instances, multiple sync scenarios may be defined for different applications, but only one sync scenario may be associated with a particular user or particular application. Different applications may apply different and distinct sets of sync scenarios, as the need for particular data sets and synchronization operations differ based on the particular functionality and requirements of different client applications.

At 420, a determination is made as to whether a single partial sync scenario is available, or whether a plurality of partial sync scenarios have been defined and are available. If only a single scenario is available, method 400 continues at 425. If, however, multiple scenarios are available, method 400 continues at 435. In the single scenario situation, at 425 the single light sync scenario is associated with the request. At 430, the phases and corresponding phase scopes of those phases are identified based on their definition within the partial sync scenario. At 430, the phases of the single partial sync scenario are executed as defined. After execution, the client application can be considered updated.

Returning to 430, in response to multiple sync scenarios being available, method 400 continues at 435. At 435, a set of predefined contexts associated with each of the set of potential light sync scenarios are identified. The predefined contexts may be associated with or defined within each of the scenarios, and determine when a particular sync scenario is to be used if no specific sync scenario was specifically requested. At 440, the identified predefined contexts of each of the scenarios are compared to the identified context of the received request to determine a match or best correspondence. In some instances, two or more predefined contexts may at least partially match the request context. In those instances, a predefined priority may be associated with different contexts to determine how to differentiate from different matches. Alternative solutions for comparing and ranking or otherwise separating several matches or correspondences may be used, as appropriate.

Once a match is found, at 445, the particular one of the partial sync scenarios identified as a match at 440 is associated with the received request. At 450, the phases and corresponding phase scopes of those phases for the particular partial sync scenario is identified based on their definition within the partial sync scenario. As described above, the partial sync scenario can identify the particular phases, or actions, to be taken when performing the particular sync scenario. A combination of one or more phases may be associated with the sync scenario, and may be associated with specific instructions within the phase or may perform a full set of actions associated with the phase. The particular phases and phase scopes can be set or assigned by an administrator, key user, or the end user in different instances or implementations.

At 455, the specific phases of the particular partial sync scenario are executed within their respectively defined scope. After execution, the client application can be considered updated. In some instances, the particular phases and phase scopes may require actions performed at both the client and at a backend system. The client application or a backend application (or other suitable components) can be notified of the information required to perform the particular phases of the partial sync. For example, the client application may transmit files or data to be uploaded to the backend system based on a particular phase in the partial sync scenario, while also requesting additional information from the backend system in another phase. The various actions can be performed through a series of communications to or from either the client application or the backend application (or other suitable components).

As described, the determination of the proper partial sync scenario may be performed at the client or at the backend system in different implementations, or based on the particular client application and client setup in some instances. When the sync version determination is made at the client or by the client application, the client application or a related component can initiate any uploads of data or actions to be performed at the client while sending requests to the backend system for updated data and relevant backend actions included in the phases defined for the particular sync scenario. When the sync version determination is performed by the backend system, the initial request for the sync may include a set of information received from the client, including the current network connection speed or quality, recent operations or action performed by the client application, a client location, as well as other suitable information. Based on that information, as well as other contextual information associated with the client or instance of the client application or the user associated with the client, the backend system can determine the proper sync version to be executed. In response to doing so, instructions to execute any action(s) to be performed at the client can be transmitted to the client, and any data or actions to be performed at the backend system can be executed.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computerized method executed by at least one processor, the method comprising:
    identifying a triggering event associated with a request to perform a synchronization of a client application executing on a client device, the request associated with a request for a partial synchronization of the client application;
    obtaining a set of information defining a request context associated with the request to perform the synchronization of the client application, wherein the request context identifies a network connection speed or connection quality of the client device to a particular communications network at the time of the identified triggering event;
    identifying a set of potential partial synchronization scenarios, each of the potential partial synchronization scenarios associated with a predefined synchronization context;
    comparing the request context to the predefined synchronization contexts of the set of potential partial synchronization scenarios to identify a particular partial synchronization scenario corresponding to the request context; and
    in response to identifying the particular partial synchronization scenario corresponding to the request context, performing a set of synchronization operations defined in the identified partial synchronization scenario.

2. The method of claim 1, wherein at least two of the potential partial synchronization scenarios are associated with predefined synchronization contexts identifying two different network connections speeds or quality, and wherein comparing the request context to the predefined synchronization contexts comprises matching the network connection speed or quality of the client device to a network connection speed or quality defined in at least one of the predefined synchronization contexts.

3. The method of claim 1, wherein the request context identifies a set of user-specific information associated with the user of the client device.

4. The method of claim 3, wherein the set of user-specific information includes at least one role associated with the user of the client device, and wherein at least two of the potential partial synchronization scenarios are associated with predefined synchronization contexts identifying at least one particular role within an organization, and wherein comparing the request context to the predefined synchronization contexts comprises matching the at least one role associated with the user of the client device to at least one role defined in at least one of the predefined synchronization contexts.

5. The method of claim 3, wherein the set of user-specific information uniquely identifies the user of the client device, at least one of the predefined synchronization contexts of the potential partial synchronization scenarios specifically identifies the user of the client device, and wherein comparing the request context to the predefined synchronization contexts comprises associating at least one of potential partial synchronization scenarios having a predefined synchronization context specifically identifying the user of the client device as the particular partial synchronization scenario.

6. The method of claim 1, wherein the request context identifies a time of a last synchronization of the client application, and wherein at least one of the predefined synchronization contexts of the potential partial synchronization scenarios is associated with a predefined synchronization context representing a particular time since a prior synchronization.

7. The method of claim 1, wherein each of the partial synchronization scenarios define a particular combination of synchronization phases to be performed during execution of the particular partial synchronization scenario, each synchronization phases identifying particular synchronization actions.

8. The method of claim 7, wherein a full synchronization scenario performs a first set of synchronization phases, and wherein each of the partial synchronization scenarios perform a subset of the first set of synchronization phases.

9. The method of claim 8, wherein for at least one partial synchronization scenario comprising a subset of the first set of synchronization phases, executing the at least one partial synchronization scenario comprises performing a partial execution of at least one synchronization phase.

10. The method of claim 1, wherein the triggering event occurs in response to an action performed in a user interface associated with the client application, and wherein the triggering event includes an indication of a request to perform a partial synchronization of the client application.

11. The method of claim 1, wherein the triggering event occurs automatically in response reestablishing a network connection after a period of offline activity for the client application.

12. A system comprising:
at least one processor; and
a memory communicatively coupled to the at least one processor, the memory storing instructions which, when executed, cause the at least one processor to perform operations comprising:
identifying a triggering event associated with a request to perform a synchronization of a client application executing on a client device, the request associated with a request for a partial synchronization of the client application;

obtaining a set of information defining a request context associated with the request to perform the synchronization of the client application, wherein the request context identifies a network connection speed or connection quality of the client device to a particular communications network at the time of the identified triggering event;
identifying a set of potential partial synchronization scenarios, each of the potential partial synchronization scenarios associated with a predefined synchronization context;
comparing the request context to the predefined synchronization contexts of the set of potential partial synchronization scenarios to identify a particular partial synchronization scenario corresponding to the request context; and
in response to identifying the particular partial synchronization scenario corresponding to the request context, performing a set of synchronization operations defined in the identified partial synchronization scenario.

13. The system of claim 12, wherein at least two of the potential partial synchronization scenarios are associated with predefined synchronization contexts identifying two different network connections speeds or quality, and wherein comparing the request context to the predefined synchronization contexts comprises matching the network connection speed or quality of the client device to a network connection speed or quality defined in at least one of the predefined synchronization contexts.

14. The system of claim 12, wherein the request context identifies a set of user-specific information associated with the user of the client device, wherein the set of user-specific information includes at least one role associated with the user of the client device, and wherein at least two of the potential partial synchronization scenarios are associated with predefined synchronization contexts identifying at least one particular role within an organization, and wherein comparing the request context to the predefined synchronization contexts comprises matching the at least one role associated with the user of the client device to at least one role defined in at least one of the predefined synchronization contexts.

15. The system of claim 12, wherein the request context identifies a set of user-specific information associated with the user of the client device, wherein the set of user-specific information uniquely identifies the user of the client device, at least one of the predefined synchronization contexts of the potential partial synchronization scenarios specifically identifies the user of the client device, and wherein comparing the request context to the predefined synchronization contexts comprises associating at least one of potential partial synchronization scenarios having a predefined synchronization context specifically identifying the user of the client device as the particular partial synchronization scenario.

16. A non-transitory computer-readable medium storing instructions which, when executed, cause at least one processor to perform operations comprising:
identifying a triggering event associated with a request to perform a synchronization of a client application executing on a client device, the request associated with a request for a partial synchronization of the client application;
obtaining a set of information defining a request context associated with the request to perform the synchronization of the client application;

identifying a set of potential partial synchronization scenarios, each of the potential partial synchronization scenarios associated with a predefined synchronization context, wherein at least two of the potential partial synchronization scenarios are associated with predefined synchronization context identifying two different network connections speeds or quality;

comparing the request context to the predefined synchronization contexts of the set of potential partial synchronization scenarios to identify a particular partial synchronization scenario corresponding to the request context, including matching a network connection speed or quality of the client device to a network speed or quality defined in at least one of the predefined synchronization contexts; and in response to identifying the particular partial synchronization scenario corresponding to the request context, performing a set of synchronization operations defined in the identified partial synchronization scenario.

17. The computer-readable medium of claim 16, wherein the request context identifies the network connection speed or connection quality of the client device to a particular communications network at the time of the identified triggering event.

* * * * *